(12) United States Patent
Kim et al.

(10) Patent No.: US 9,515,759 B2
(45) Date of Patent: Dec. 6, 2016

(54) METHOD OF DEMODULATING DATA ON NEW TYPE OF CARRIER WAVE

(71) Applicant: LG Electronics Inc., Seoul (KR)

(72) Inventors: Bonghoe Kim, Anyang-si (KR); Yunjung Yi, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 14/396,885

(22) PCT Filed: May 9, 2013

(86) PCT No.: PCT/KR2013/004115
§ 371 (c)(1),
(2) Date: Oct. 24, 2014

(87) PCT Pub. No.: WO2013/169050
PCT Pub. Date: Nov. 14, 2013

(65) Prior Publication Data
US 2015/0117345 A1    Apr. 30, 2015

Related U.S. Application Data

(60) Provisional application No. 61/645,640, filed on May 11, 2012, provisional application No. 61/813,145, filed on Apr. 17, 2013.

(51) Int. Cl.
*H04J 11/00* (2006.01)
*H04L 5/00* (2006.01)

(52) U.S. Cl.
CPC ............. *H04J 11/005* (2013.01); *H04L 5/005* (2013.01); *H04L 5/0051* (2013.01); *H04L 5/0091* (2013.01); *H04L 5/001* (2013.01); *H04L 5/0007* (2013.01); *H04L 5/0016* (2013.01)

(58) Field of Classification Search
None
See application file for complete search history.

(56) References Cited

U.S. PATENT DOCUMENTS

2011/0194536 A1    8/2011    Kim et al.
2011/0255483 A1*  10/2011    Xu ................. H04L 25/0232
                                                     370/329

(Continued)

FOREIGN PATENT DOCUMENTS

| WO | 2010/128831 A2 | 11/2010 |
| WO | 2011/025278 A2 | 3/2011 |
| WO | 2012/015238 A2 | 2/2012 |

OTHER PUBLICATIONS

Intel Corporation, "Discussions on Reference Symbol Design for New Carrier Types", R1-121532, 3GPP TSG RAN WG1 Meeting #68-Bis, Jeju Island, Korea, Mar. 26-30, 2012, 6 pages.

*Primary Examiner* — Chi H Pham
*Assistant Examiner* — Soon-Dong D Hyun
(74) *Attorney, Agent, or Firm* — Dentons US LLP

(57) ABSTRACT

A method of demodulating data according to an embodiment of the present invention is presented. The method of demodulating data may include: setting a terminal to be in a transmission mode of PDSCH to which transmission diversity is applied; receiving resource allocation information on the PDSCH by the terminal; transmitting downlink (DL) data onto the PDSCH to which the transmission diversity is applied, according to the resource allocation information; receiving, from a base station, information on the number of antenna ports used for receiving a reference signal that is used for demodulating the DL data; and receiving a reference signal used for demodulating the DL data. The reference signal may be generated based on the identifier of the terminal, and the number of antenna ports used for receiving the reference signal may be the same as the number of antenna ports used for receiving the PDSCH.

12 Claims, 16 Drawing Sheets

(56) References Cited

U.S. PATENT DOCUMENTS

| | | | |
|---|---|---|---|
| 2012/0082119 A1* | 4/2012 | Chung | H04B 7/06 370/329 |
| 2012/0300741 A1* | 11/2012 | Han | H04L 1/1854 370/329 |
| 2013/0083753 A1* | 4/2013 | Lee | H04W 72/0453 370/329 |
| 2013/0242886 A1* | 9/2013 | Chen | H04L 5/1469 370/329 |
| 2013/0250879 A1* | 9/2013 | Ng | H04W 72/042 370/329 |
| 2014/0286219 A1* | 9/2014 | Siomina | H04J 11/0023 370/311 |

* cited by examiner (BPP2012-0302)

Antenna 0

Antenna 0

Antenna 1

Antenna 2

Antenna 3

(a)

(b)

METHOD OF DEMODULATING DATA ON NEW TYPE OF CARRIER WAVE

This Application is a 35 U.S.C. §371 National Stage entry of International Application No. PCT/KR2013/004115, filed May 9, 2013, which claims benefit of Provisional Application No. 61/645,640 filed May 11, 2012 and 61/813,145 filed Apr. 17, 2013, all of which are incorporated by reference in their entirety herein.

BACKGROUND OF THE INVENTION

Field of the Invention

The present invention relates to a data demodulation method, and more particularly, to a method of demodulating data on a new-type carrier.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. In recent years, there is an ongoing discussion on 3GPP LTE-advanced (LTE-A) evolved from the 3GPP LTE.

As described in 3GPP TS 36.211 V8.7.0 (2009-05) "Evolved Universal Terrestrial Radio Access (E-UTRA); Physical Channels and Modulation (Release 8)", in 3GPP LTE/LTE-A, a physical channel can be divided into a downlink channel (e.g., a physical downlink shared channel (PDSCH) and a physical downlink control channel (PDCCH)) and an uplink channel (e.g., a physical uplink shared channel (PUSCH) and a physical uplink control channel (PUCCH)).

SUMMARY OF THE INVENTION

In the existing $3^{rd}$ generation partnership project (3GPP) long term evolution (LTE), a cell-specific reference signal (CRS) is provided as a reference signal. However, since the CRS is transmitted in all subframe across a full system band, an overhead is great as a result. To decrease the overhead, the CRS is not transmitted or the CRS needs to be transmitted by using a limited resource.

Accordingly, an object of the present specification is not to transmit the CRS to decrease the overhead, or is to provide a new-type carrier for transmitting the CRS by using a limited resource. Such a carrier type is called a new carrier type (NCT).

In addition, an object of the present invention is to provide a method of enabling demodulation of a physical downlink shared channel (PDSCH) in a new-type carrier on which the CRS is not transmitted.

According to an embodiment of the present invention, a demodulation method is provided. The data demodulation method may comprise: setting a terminal to a transmission mode of a physical downlink shared channel (PDSCH) to which a transmit diversity is applied; receiving resource allocation information of the PDSCH by the terminal; receiving downlink (DL) data on the PDSCH to which the transmit diversity is applied according to the resource allocation information; receiving information regarding the number of antenna ports used for reception of a reference signal used for demodulation of the DL data; and receiving the reference signal used for demodulation of the DL data. Here, the reference signal may be generated based on an identifier of the terminal. Also, the number of antenna ports used for reception of the reference signal may be equal to the number of antenna ports used for reception of the PDSCH.

The PDSCH and the reference signal may be received in a second serving cell activated by a first serving cell.

The reference signal may be generated on the basis of the identifier of the terminal and an identifier of the second serving cell. The number of antenna ports used in reception of the reference signal may be equal to the number of antenna ports of a channel state information (CSI) reference signal (RS) used in measurement of CSI. The transmit diversity is applied to the reference signal.

According to an embodiment of the present invention, there is provided a data demodulation method. The data demodulation method may comprise: receiving information regarding multiple transmit antennas for a transmit diversity from a secondary cell operating with a second type carrier and activated by a primary cell operating with a first type carrier, wherein a cell-specific reference signal (CRS) is contained in the first type carrier, and a user-specific reference signal (URS) is contained in the second type carrier; receiving a shared data channel on the second type carrier, which is transmitted by applying the transmit diversity by the use of the multiple transmit antennas of the secondary cell; and demodulating data on the shared data channel by using the URS.

The CRS capable of demodulating the data on the shared data channel may be not sufficient or is not transmitted on the second type carrier.

The method may further comprise receiving information regarding the number of antenna ports on which the URS is transmitted.

The information regarding the number of antenna ports on which the URS is transmitted may be acquired from information regarding the number of antenna ports on which a CSI-RS is transmitted.

The information regarding the number of antenna ports on which the URS is transmitted may be received through a radio resource control (RRC) message or a physical downlink control channel (PDCCH).

Different precoding may be applied to the URS and the data.

If a distributed virtual resource block (DVRB) is used in the second type carrier of the secondary cell, precoding applied to the URS may be changed in unit of a slot on a time axis.

Meanwhile, According to an embodiment of the present invention, there is provided a transmission method in a secondary cell operating with a second type carrier and activated by a primary cell operating with a first type carrier. The method may comprise: transmitting information regarding multiple transmit antennas for a transmit diversity on the second type carrier; transmitting a user equipment specific reference signal (URS) on the second type carrier by using the transmit diversity by the use of the multiple transmit antennas; and transmitting data on the second type carrier through a shared data channel by using the transmit diversity by the use of the multiple transmit antennas.

The CRS capable of demodulating the data on the shared data channel may be not sufficient or is not transmitted on the second type carrier.

The method may further comprise transmitting information regarding the number of antenna ports on which the URS is transmitted. The information regarding the number of antenna ports on which the URS is transmitted may be transmitted through information regarding the number of antenna ports on which a CSI-RS is transmitted. The information regarding the number of antenna ports on which the URS is transmitted may be transmitted through a radio resource control (RRC) message or a physical downlink control channel (PDCCH).

According to a new-type carrier provided in the present specification, an overhead can be decreased by not transmitting a cell-specific reference signal (CRS) or by transmitting the CRS by the use of only a limited resource.

In addition, according to one method provided in the present specification, a physical downlink shared channel (PDSCH) can be smoothly demodulated even in case of using a new-type carrier on which the CRS is not transmitted.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE.

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved Node-B (eNB), a base transceiver system (BTS), an access point, etc.

Hereinafter, the present invention is applied to $3^{rd}$ generation partnership project (3GPP) long term evolution (LTE) based on a 3GPP technical specification (TS) release 8 or 3GPP LTE-Advanced (LTE-A) based on 3GPP TS release 10. This is for exemplary purposes only, and thus the present invention is applicable to various communication systems. In the following description, LTE and/or LTE-A are collectively referred to as LTE.

Figure 1:
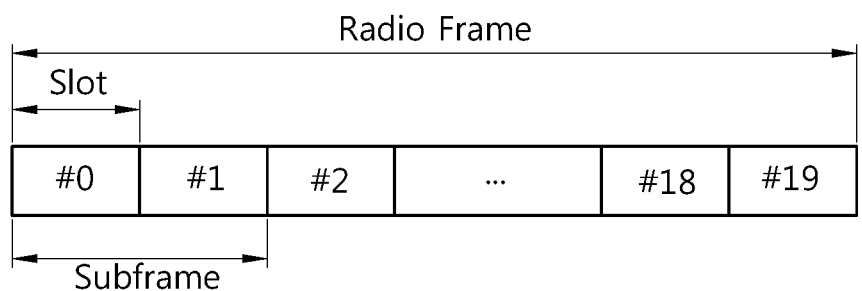
FIG. 1 shows a structure of a radio frame in $3^{rd}$ generation partnership project (3GPP) long term evolution (LTE).

FIG. 1 shows a structure of a radio frame in 3GPP LTE.

The section 5 of 3GPP (3rd Generation Partnership Project) TS 36.211 V10.4.0 (2011-12) "Technical Specification Group Radio Access Network; Evolved Universal Terrestrial Radio Access (E-UTRA); Physical channels and modulation (Release 10)" can be incorporated herein by reference.

Referring to FIG. 1, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used as an uplink multiple-access scheme. A resource block (RB) is a resource allocation unit, and includes a plurality of consecutive subcarriers in one slot.

The radio frame structure of FIG. 1 is shown for exemplary purposes only. Thus, the number of subframes included in the radio frame, the number of slots included in the subframe, or the number of OFDM symbols included in the slot may change variously. In 3GPP LTE, it is defined such that one slot includes 7 OFDM symbols in a normal cyclic prefix (CP) and one slot includes 6 OFDM symbols in an extended CP.

Figure 2:
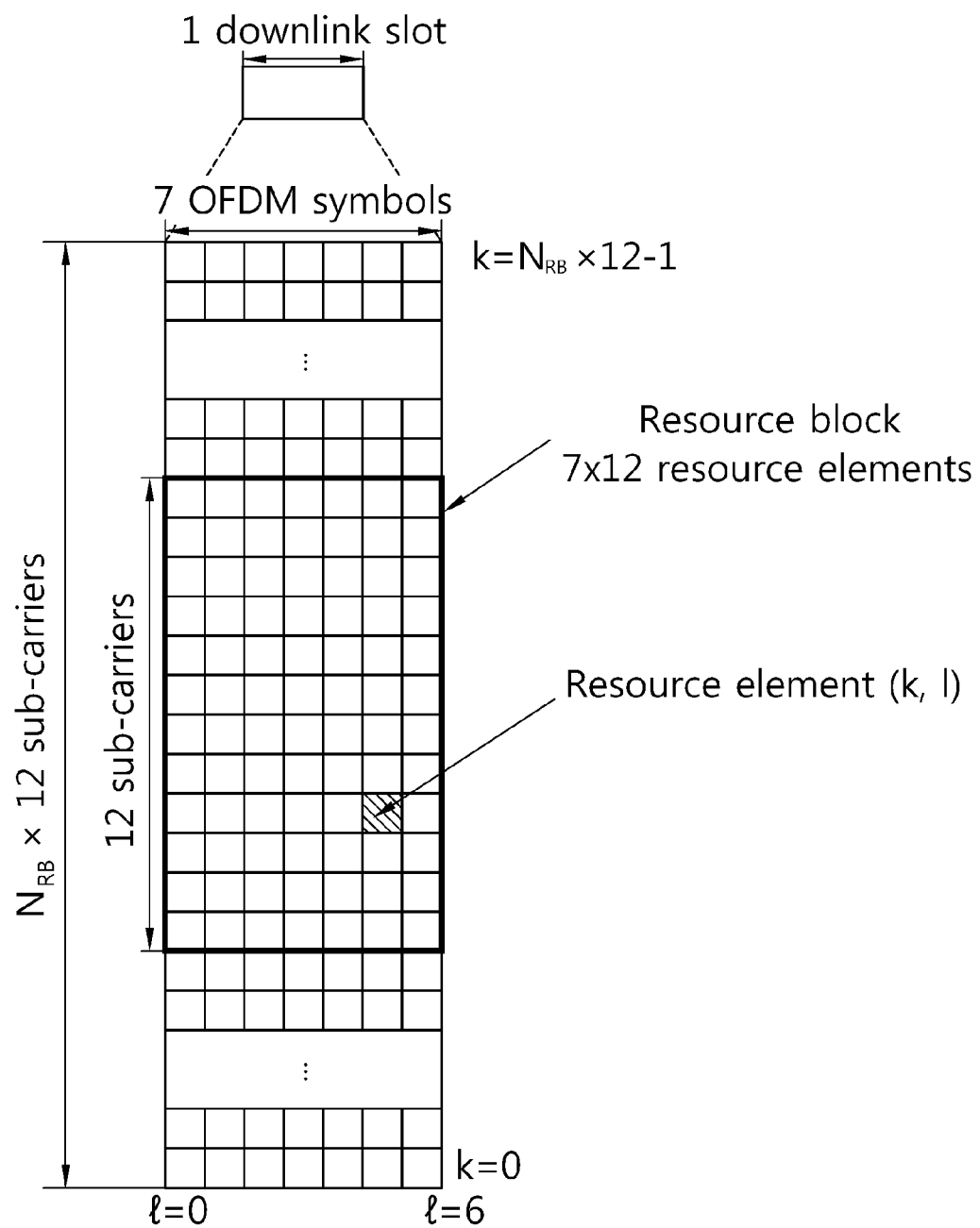
FIG. 2 shows an example of a resource grid for one downlink slot.

FIG. 2 shows an example of a resource grid for one downlink slot.

The downlink slot includes a plurality of OFDM symbols in a time domain, and includes $N_{RB}$ resource blocks (RBs) in a frequency domain. The number $N_{RB}$ of RBs included in the downlink slot depends on a downlink transmission bandwidth configured in a cell. For example, in the LTE system, $N_{RB}$ may be any one value in the range of 6 to 110. One RB includes a plurality of subcarriers in a frequency domain. A structure of an uplink slot may be the same as the aforementioned structure of the downlink slot.

Each element on the resource grid is referred to as a resource element (RE). The RE is a smallest frequency-time unit to which a modulation symbol of a data or control channel is mapped. The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described herein that one RB consists of 7 OFDM symbols in the time domain and 12 subcarriers in the frequency domain and thus includes 7×12 REs, this is for exemplary purposes only. Therefore, the number of OFDM symbols and the number of subcarriers in the RB are not limited thereto. The number of OFDM symbols and the number of subcarriers may change variously depending on a CP length, a frequency spacing, etc.

Meanwhile, the aforementioned resource can be re-defined in various concepts.

A 'physical resource block (PRB)' is a resource allocation unit for data transmission. One PRB consists of consecutive REs in a frequency-time domain, and a plurality of PRBs are defined in one subframe.

A 'virtual resource block (VRB)' is a virtual resource allocation unit for data transmission. The number of REs included in one VRB is equal to the number of REs included in one PRB. In data transmission, one VRB can be mapped to one PRB or can be mapped to some areas of a plurality of PRBs. That is, a size of the VRB is the same as a size of the PRB.

The VRB can be defined by being classified into a localized VRB (LVRB) and a distributed VRB (DVRB). For each type of VRB, a pair of VRBs located in two slots in one subframe is allocated together with a single VRB number nVRB. In other words, any one index from 0 to $N_{RB}^{DL}-1$ is assigned to each of $N_{RB}^{DL}$ VRBs belonging to a first slot between two slots constituting one subframe, and likewise any one index from 0 to $N_{RB}^{DL}-1$ is assigned to each of $N_{RB}^{DL}$ VRBs belonging to a second slot between the two slots.

Two types of VRBs are defined. A first type is a localized VRB (LVRB), and a second type is a distributed VRB (DVRB).

The LVRB is one type of the VRB. One LVRB is mapped to one PRB, and there is no overlapping of PRBs to which different LVRBs are mapped.

The DVRB is another type of the VRB. One DVRB is mapped to some REs in a plurality of PRBs, and there is no overlapping of REs which are mapped to different DVRBs.

$N_{PRB}$ denotes the number of PRBs in the system. $N_{LVRB}$ denotes the number of available LVRBs in the system. $N_{DVRB}$ denotes the number of available DVRBs in the system. $N_{LVRB\_UE}$ denotes the maximum number of LVRBs allocated to a UE. $N_{DVRB\_UE}$ denotes the maximum number of DVRBs allocated to one UE. $N_{subset}$ denotes the number of subsets.

As a simple method for signaling a resource allocation, it is possible to use a bitmap consisting of $N_{PRB}$ bits for each scheduled UE so that $N_{PRB}$ PRBs of a system are scheduled in unit of PRB. In the bitmap, each bit corresponds to one PRB, and thus $N_{PRB}$ PRBs are allocated in unit of PRB. However, if the number of PRBs of the system is great, an overhead is increased in this method since the number of bits of the bitmap is excessively increased.

In 3GPP LTE, to avoid the increase in the overhead of the bitmap, resource allocation types 0, 1, and 2 are provided as follows.

The resource allocation type 0 is a type in which a resource block group (RBG) which is a group of consecutive PRBs is allocated to a UE by using a bitmap. That is, in the resource allocation type 0, a resource allocation unit is not one RB but the RBG. A size of the RBG (this is denoted by P), that is, the number of RBs constituting the RBG, is determined depending on a system band. The resource allocation type 0 is also called an RBG type.

The resource allocation type 1 is a type in which a resource is allocated to a UE in unit of PRB in a subset by using a bitmap. The subset consists of a plurality of non-consecutive RBGs. The resource allocation type 1 is also called a subset type.

The resource allocation type 2 includes a type in which consecutive PRBs are allocated and a type in which non-consecutive PRBs are allocated. The resource allocation type 2 is also called a compact type.

Figure 3:
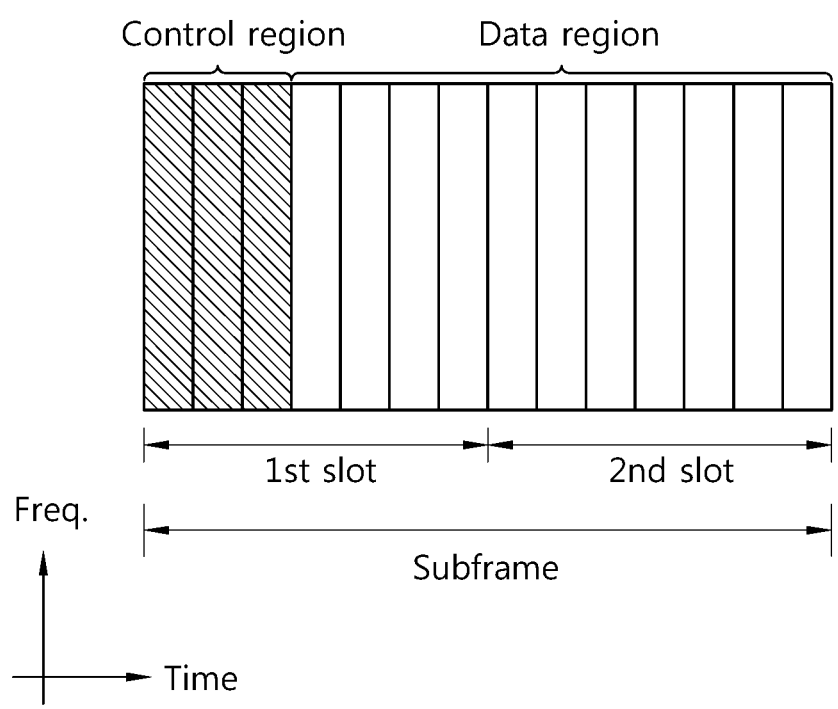
FIG. 3 shows a structure of a downlink subframe.

FIG. 3 shows a structure of a downlink subframe.

The downlink (DL) subframe is divided into a control region and a data region in a time domain. The control region includes up to four preceding OFDM symbols of a $1^{st}$ slot in the subframe. The number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.4.0, in 3GPP LTE/LTE-A, a physical control channel includes a PDCCH, a physical control format indicator channel (PCFICH), a physical hybrid-ARQ indicator channel (PHICH), etc. In addition, a control signal transmitted in a physical layer may be a primary synchronization signal (PSS), a secondary synchronization signal (SSS), and a random access preamble.

The PSS is transmitted in last OFDM symbols of a $1^{st}$ slot (i.e., a $1^{st}$ slot of a $1^{st}$ subframe (i.e., a subframe with an index 0)) and an $11^{th}$ slot (i.e., a $1^{st}$ slot of a $6^{th}$ subframe (i.e., a subframe with an index 5)). The PSS is used to attain OFDM symbol synchronization or slot synchronization, and is in association with a physical cell identity (ID). A primary synchronization code (PSC) is a sequence used for the PSS. There are three PSCs in the 3GPP LTE. One of the three PSCs is transmitted using the PSS according to the cell ID. The same PSC is used for each of the last OFDM symbols of the $1^{st}$ slot and the $11^{th}$ slot.

The SSS includes a $1^{st}$ SSS and a $2^{nd}$ SSS. The $1^{st}$ SSS and the $2^{nd}$ SSS are transmitted in an OFDM symbol adjacent to an OFDM symbol in which the PSS is transmitted. The SSS is used to attain frame synchronization. The SSS is used to attain a cell ID together with the PSS. The $1^{st}$ SSS and the $2^{nd}$ SSS use different secondary synchronization codes (SSCs). If each of the $1^{st}$ SSS and the $2^{nd}$ SSS includes 31 subcarriers, sequences of two SSCs with a length of 31 are respectively used for the $1^{st}$ SSS and the $2^{nd}$ SSS.

The PCFICH transmitted in a first OFDM symbol of the subframe carries a control format indicator (CFI) regarding the number of OFDM symbols (i.e., a size of the control region) used for transmission of control channels in the subframe. A UE first receives the CFI on the PCFICH, and thereafter monitors the PDCCH. The PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

A BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC. The TPC-RNTI may be masked to the CRC to indicate a transmit power control (TPC) command for a plurality of UEs.

A control region in a subframe includes a plurality of control channel elements (CCEs). The CCE is a logical allocation unit used to provide the PDCCH with a coding rate depending on a wireless channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a UE having a good DL channel state can use one CCE in PDCCH transmission. A UE having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, the UE cannot know about a specific position in a control region in which its PDCCH is transmitted and about a specific CCE aggregation or DCI format used for PDCCH transmission. A plurality of PDCCHs can be transmitted in one subframe, and thus the UE monitors the plurality of PDCCHs in every subframe. Monitoring is an operation of attempting PDCCH decoding by the UE according to a PDCCH format.

The 3GPP LTE uses a search space to reduce an overhead of blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 below shows the number of PDCCH candidates monitored by the UE.

TABLE 1

| Search Space Type | Aggregation level L | Size [in CCEs] | Number of PDCCH candidates | DCI formats |
|---|---|---|---|---|
| UE-specific | 1 | 6 | 6 | 0, 1, 1A, |
|  | 2 | 12 | 6 | 1B, 1D, |
|  | 4 | 8 | 2 | 2, 2A |
|  | 8 | 16 | 2 |  |
| Common | 4 | 16 | 4 | 0, 1A, 1C, |
|  | 8 | 16 | 2 | 3/3A |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1, 2, 3, 4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor \} + i \qquad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the UE, m'=m+$M^{(L)}n_{cif}$. Herein, $n_{cif}$ is a value of the CIF. If the CIF is not set to the UE, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \qquad \text{[Equation 2]}$$

Herein, $Y_{-1} = n_{RNTI} \neq 0$, A=39827, D=65537, k=floor($n_s$/2), and $n_s$ denotes a slot number in a radio frame.

When the UE monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single antenna port, port 0 |
|  | DCI format 1 | UE specific | Single antenna port, port 0 |
| Mode 2 | DCI format 1A | common and UE specific | Transmit diversity |
|  | DCI format 1 | UE specific | Transmit diversity |

TABLE 2-continued

| Transmission mode | DCI format | search space | Transmission mode of PDSCH based on PDCCH |
|---|---|---|---|
| Mode 3 | DCI format 1A | common and UE specific | Transmit diversity |
| | DCI format 2A | UE specific | CDD(Cyclic Delay Diversity) or Transmit diversity |
| Mode 4 | DCI format 1A | common and UE specific | Transmit diversity |
| | DCI format 2 | UE specific | Closed-loop spatial multiplexing |
| Mode 5 | DCI format 1A | common and UE specific | Transmit diversity |
| | DCI format 1D | UE specific | MU-MIMO(Multi-user Multiple Input Multiple Output) |
| Mode 6 | DCI format 1A | common and UE specific | Transmit diversity |
| | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
| | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
| | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Meanwhile, a DL transmission mode between a BS and a UE can be classified into 9 types as follows. The number of transport blocks or codewords included in the PDSCH in each subframe may vary depending on the DL transmission mode.

Transmission mode 1: A mode in which precoding is not performed (a single antenna port transmission mode).

Transmission mode 2: A transmission mode that can be used in 2 or 4 antenna ports using space-frequency block coding (SFBC) (transmit diversity).

Transmission mode 3: An open-loop mode in which rank adaptation based on RI feedback is possible (open-loop spatial multiplexing). The transmit diversity is applicable when a rank is 1. A great delay CDD can be used when the rank is greater than 1.

Transmission mode 4: A mode in which precoding feedback supporting dynamic rank adaptation is applied (closed-loop spatial multiplexing).

Transmission mode 5: Multi-user MIMO

Transmission mode 6: Closed-loop rank-1 precoding

Transmission mode 7: A transmission mode in which a UE-specific reference signal is used.

Transmission mode 8: Dual-layer transmission using antenna ports 7 and 8, or single-antenna port transmission using an antenna port 7 or an antenna port 8 (dual-layer transmission).

Transmission mode 9: Up to 8-layer transmission using antenna ports 7 to 14.

Figure 4:
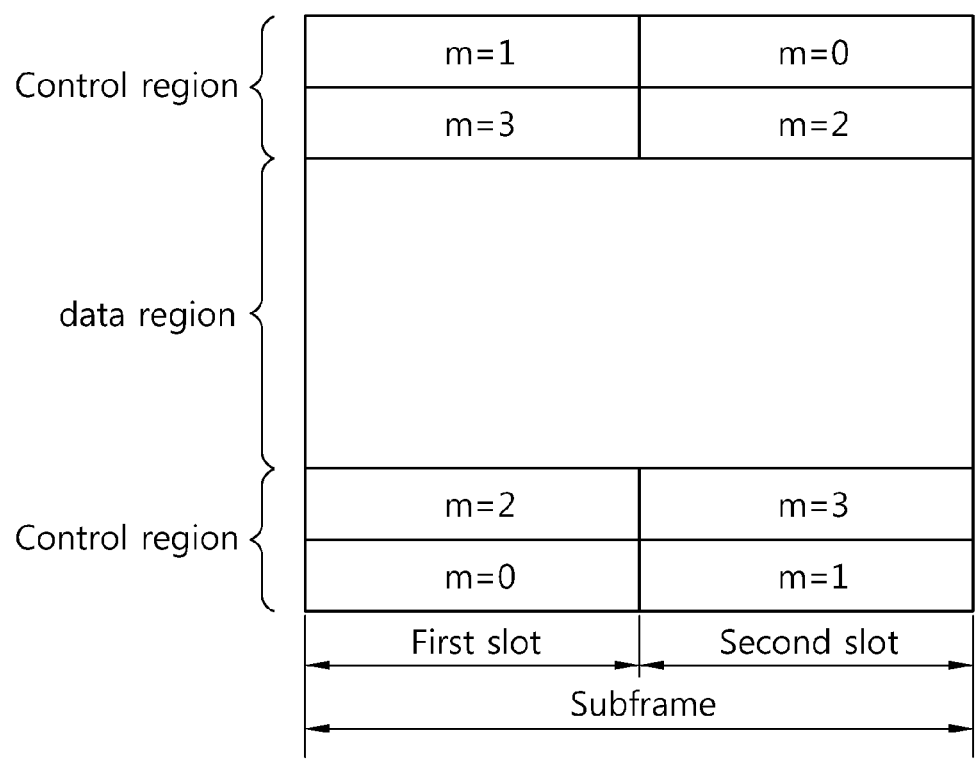
FIG. 4 shows a structure of an uplink subframe.

FIG. 4 shows a structure of an uplink subframe.

The uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated to a resource block (RB) pair in a subframe. RBs belonging to one RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. By transmitting UL control information by the UE over time through different subcarriers, a frequency diversity gain can be obtained. m denotes a location index indicating a logical frequency domain location of the RB pair allocated to the PUCCH in the subframe.

Examples of the uplink control information transmitted on the PUCCH include a hybrid automatic repeat request (HARQ) acknowledgement (ACK), a channel quality indicator (CQI) indicating a downlink channel state, and a scheduling request (SR) which is an uplink radio resource allocation request.

Meanwhile, there is a growing demand on a high data transfer rate. Therefore, a carrier aggregation (CA) supporting a plurality of cells can be applied in 3GPP LTE-A. The CA may also be referred to as other terms such as a bandwidth aggregation, or the like. The CA implies a system which configures a wideband by aggregating one or more carriers having a bandwidth smaller than that of a desired wideband when the wireless communication system intends to support the wideband. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

A plurality of BSs and UEs may communicate with each other through up to 5 cells. The 5 cells may correspond to a bandwidth of up to 100 MHz. That is, a CA environment indicates a case where a specific UE has two or more configured serving cells (hereinafter, simply referred to as cells) having different carrier frequencies. The carrier frequency indicates a center frequency of the cell.

The cell indicates a combination of a DL resource and optionally a UL resource. That is, the cell must include the DL resource, and may optionally include the UL resource to be combined with the DL resource. The DL resource may be a DL component carrier (CC). The UL resource may be a UL CC. If a specific UE has one configured serving cell, it may have one DL CC and one UL CC. If the specific UE has two or more cells, the number of DL CC may be equal to the number of cells or the number of UL CCs may be less than or equal to the number of cells. That is, if the CA is supported in the current 3GPP LTE-A, the number of DL CCs may always be greater than or equal to the number of UL CCs. However, a CA in which the number of DL CCs is less than the number of UL CCs may be supported in a release later than 3GPP LTE-A.

A linkage between a carrier frequency of a DL CC and a carrier frequency of a UL CC may be indicated by system information transmitted on the DL CC. The system information may be a system information block type2 (SIB2).

Figure 5:
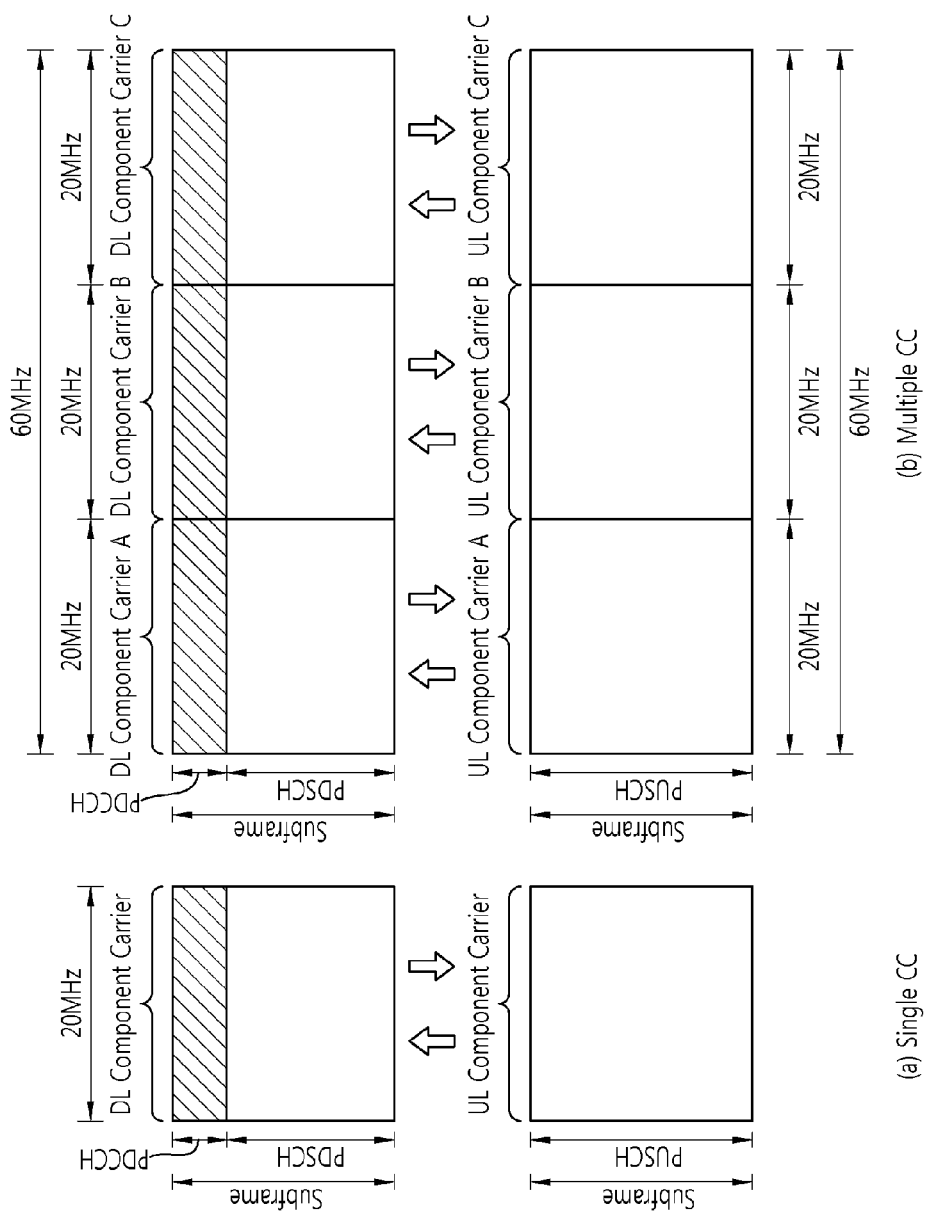
FIGS. 5a and b show examples of a subframe structure of a single-carrier system and a carrier aggregation system.

FIG. 5 shows an example of a subframe structure of a single-carrier system and a carrier aggregation system.

FIG. 5-(a) shows a single-carrier system. It is assumed in FIG. 5-(a) that a system bandwidth is 20 MHz. Since the number of carriers is 1, a bandwidth of a DL CC transmitted by a BS and a bandwidth of a UL CC transmitted by a UE are also 20 MHz. The BS performs a DL transmission through the DL CC, and the UE performs a UL transmission through the UL CC.

FIG. 5-(b) shows a carrier aggregation system. It is assumed in FIG. 5-(b) that a system bandwidth is 60 MHz. A DL bandwidth consists of a DL CC A, a DL CC B, and a DL CC C, each of which has a bandwidth of 20 MHz. A UL bandwidth consists of a UL CC A, a UL CC B, and a UL CC C, each of which has a bandwidth of 20 MHz. A BS performs a DL transmission through the DL CC A, the DL CC B, and the DL CC C, and the UE performs the DL transmission through the UL CC A, the UL CC B, and the UL CC C. The DL CC A and the UL CC A, the DL CC B and the UL CC B, and the DL CC C and the UL CC C may correspond to each other.

The UE may simultaneously monitor and/or receive a DL signal and/or data transmitted from multiple DL CCs. The BS may configure a DL CC in a cell-specific or UE-specific manner so that only a DL signal and/or data transmitted from M DL CCs are monitored, where M is less than the number N of DL CCs managed by a cell. In addition, the BS may configure L DL CCs in a cell-specific or UE-specific manner so that a DL signal and/or data transmitted from the L DL CCs are preferentially monitored among the M DL CCs.

A UE supporting CA may simultaneously transmit or receive one or multiple CCs according to a capacity. In addition, in order to effectively use the multiple CCs, the multiple CCs may be managed in a media access control (MAC). If the CA is configured in DL, a receiver in the UE must be able to receive multiple DL CCs, and if the CA is configured in UL, a transmitter in the UE must be able to transmit multiple UL CCs.

With an introduction of the CA environment, cross carrier scheduling may be applied. Through the cross carrier scheduling, a PDCCH on a specific DL CC may schedule a PDSCH on any one DL CC among a plurality of DL CCs, and may schedule a PUSCH on any one UL CC among a plurality of UL CCs. For the cross carrier scheduling, a carrier indicator field (CIF) may be defined. The CIF may be included in a DCI format transmitted on the PDCCH. Whether the CIF exists in the DCI format may be indicated semi-statically or UE-specifically by a higher layer. When the cross carrier scheduling is performed, the CIF may indicate a DL CC in which the PDSCH is scheduled or a UL CC in which the PUSCH is scheduled. The CIF may be fixed to 3 bits, or may exist at a fixed position irrespective of a size of the DCI format. If the CIF does not exist in the DCI format, a PDCCH on a specific DL CC may schedule a PDSCH on the same DL CC or may schedule a PUSCH on a UL CC linked to the specific DL CC using the SIB2.

If the cross carrier scheduling is performed by using the CIF, the BS may allocate a PDCCH monitoring DL CC set to decrease a blind decoding complexity of the UE. The PDCCH monitoring DL CC set is a part of the entire DL CC, and the UE performs blind decoding only for a PDCCH in the PDCCH monitoring DL CC set. That is, in order to schedule the PDSCH and/or the PUSCH with respect to the UE, the BS may transmit the PDCCH only through a DL CC in the PDCCH monitoring DL CC set. The PDCCH monitoring DL CC set may be configured in a UE specific, a UE group specific, or a cell specific manner.

Figure 6:
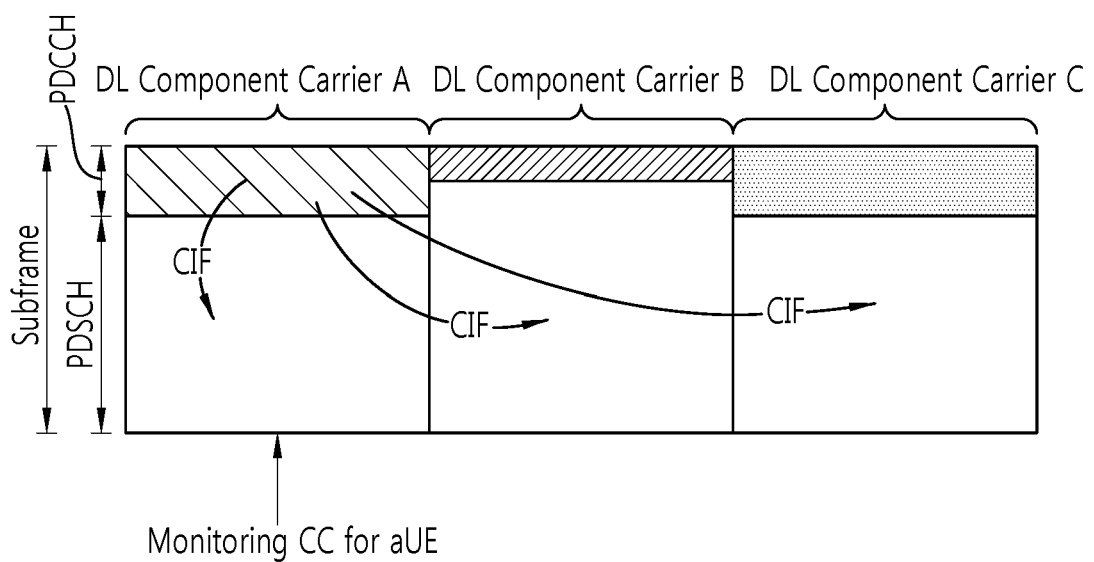
FIG. 6 shows an example of a subframe structure in which cross carrier scheduling is performed using a carrier indicator field (CIF).

FIG. 6 shows an example of a subframe structure in which cross carrier scheduling is performed using a CIF.

Referring to FIG. 6, among 3 DL CCs, a $1^{st}$ DL CC is configured as a PDCCH monitoring DL CC. If the cross carrier scheduling is not performed, the DL CCs schedule the PDSCH by transmitting respective PDCCHs. If the cross carrier scheduling is performed, only the $1^{st}$ DL CC configured as the PDCCH monitoring DL CC transmits the PDCCH. The PDCCH transmitted on the $1^{st}$ DL CC uses the CIF to schedule not only the PDSCH of the $1^{st}$ DL CC but also a PDSCH of a $2^{nd}$ DL CC and a $3^{rd}$ DL CC. The $2^{nd}$ and $3^{rd}$ DL CCs which are not configured as the PDCCH monitoring DL CC do not transmit the PDCCH.

In addition, the UE may transmit channel state information (CSI) received, detected, or measured from one or more DL CCs, UL control information such as ACK/NACK, etc., to the BS through predetermined one UL CC. The CSI may include a CQI, a precoding matrix indicator (PMI), a rank indicator (RI), etc. For example, if the UE needs to transmit an ACK/NACK signal for data received from a plurality of DL CCs, the UE may transmit a plurality of ACK/NACK signals for data received from the respective DL CCs by performing multiplexing or bundling thereon to the BS through a PUCCH of one UL CC. In 3GPP LTE, it is necessary to transmit the ACK/NACK signal for the DL CC in the following three cases.

An ACK/NACK signal for a PDSCH transmission indicated by a corresponding PDCCH in a subframe n-k may be transmitted in a subframe n. Herein, k∈K, where K is a set of M elements $\{k_0, k_1, \ldots, k_{M-1}\}$ based on the subframe n and the UL/DL configuration. This is a case where the ACK/NACL signal is transmitted for a normal PDSCH.

An ACK/NACK signal for a PDCCH of a subframe n-k indicating a release of DL semi-persistent scheduling (SPS) may be transmitted in a subframe n. Herein, k∈K, where K is a set of M elements $\{k_0, k_1, \ldots, k_{M-1}\}$ based on the subframe n and the UL/DL configuration. An ACK/NACK signal for a PDCCH indicating an activation of the DL SPS is not transmitted.

An ACK/NACK signal for a PDSCH transmission without a corresponding PDCCH in a subframe n-k may be transmitted in the subframe n. Herein, k∈K, where K is a set of M elements $\{k_0, k_1, \ldots, k_{M-1}\}$ based on a subframe n and the UL/DL configuration. This is a case where the ACK/NACK signal for the SPS is transmitted.

In the aforementioned description, K denotes a bundling window. That is, the bundling window refers to one or more DL subframes corresponding to an ACK/NACK signal in one UL subframe.

Meanwhile, various reference signals (RSs) are transmitted in a subframe.

The RS is transmitted as a sequence in general. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink reference signal (RS) can be classified into a cell-specific RS (CRS), a Multimedia Broadcast and multicast Single Frequency Network (MBSFN) RS, a UE-specific RS (URS), a positioning RS (PRS), and a channel state information (CSI) RS (CSI-RS). The CRS is an RS transmitted to all UEs in a cell, and can be used in both data demodulation and channel estimation. The MBSFN RS can be transmitted in a subframe allocated for multimedia broadcast multicast service (MBMS) transmission. The URS is an RS received by a specific UE or a specific UE group in the cell, and can also be called a demodulation RS (DM-RS). The DM-RS is primarily used in data demodulation of a specific UE or a specific UE group. The PRS may be used in location estimation of the UE. The CSI-RS is used in channel estimation for a PDSCH of an LTE-A UE. The CSI-RS is relatively sparsely arranged in a frequency domain or a time domain, and may be punctured in a data region of a normal subframe or an MBSFN subframe.

The CRS is transmitted in all downlink subframes in a cell supporting PDSCH transmission. The CRS may be transmitted on antenna ports 0 to 3. The CRS may be defined only for Δf=15 kHz.

The CSI-RS may be found in the section 6.10.1 of 3GPP TS 36.211 V10.4.0.

Figure 7:
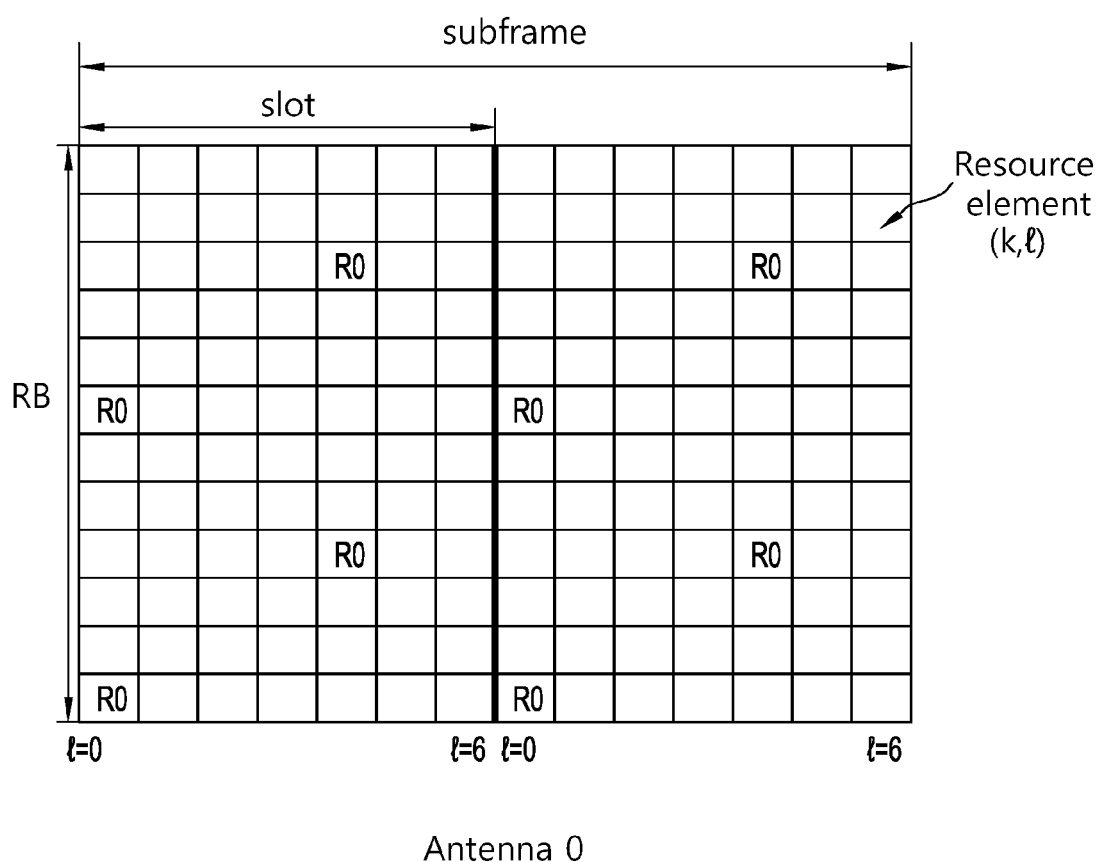
FIG. 7 to FIG. 9 show an example of a resource block (RB) to which a cell-specific reference signal (CRS) is mapped.
Figure 8:
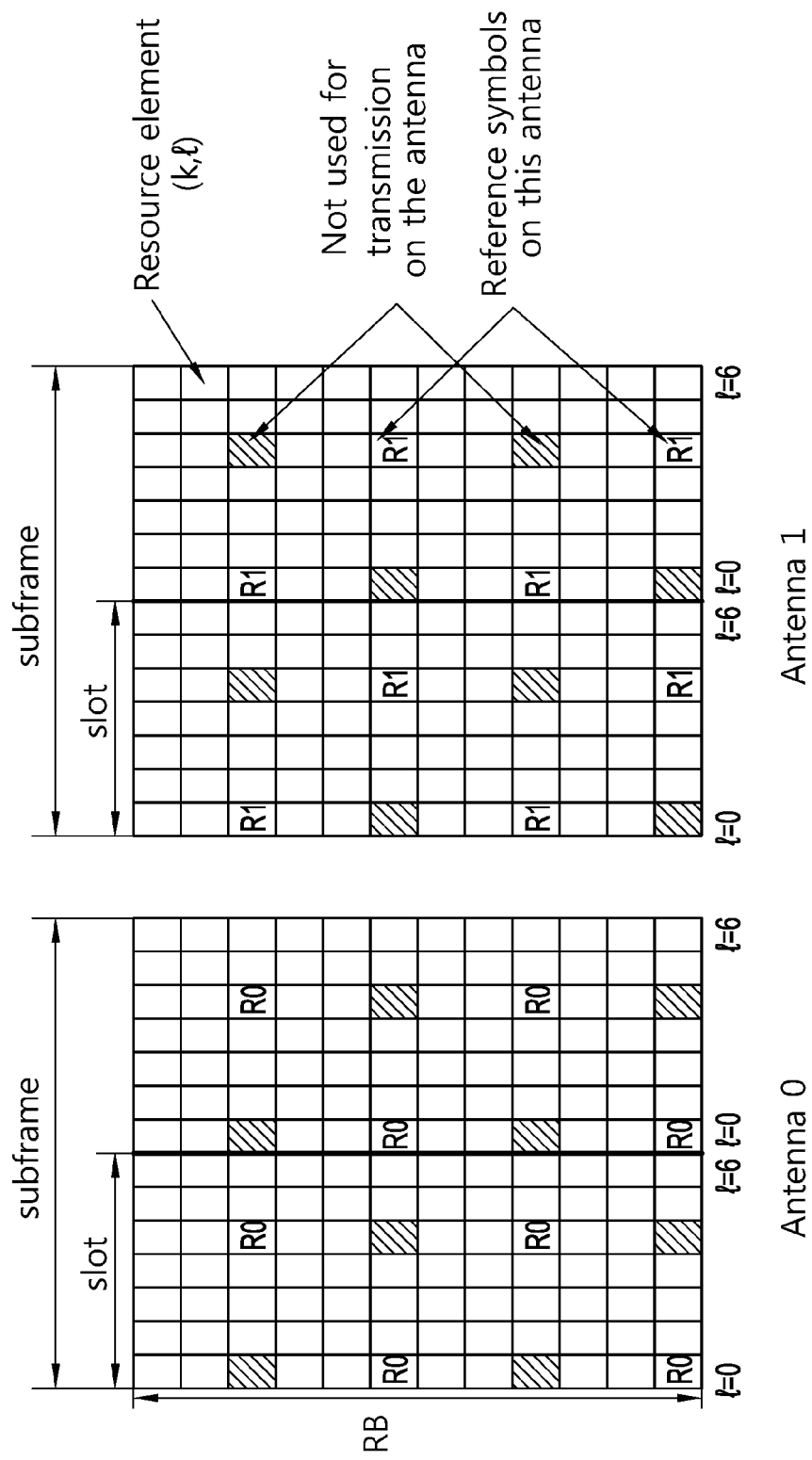
Figure 9:
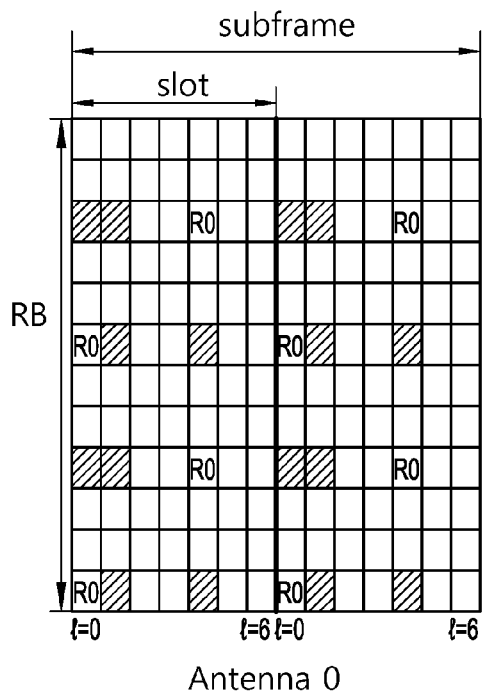
Figure 9:
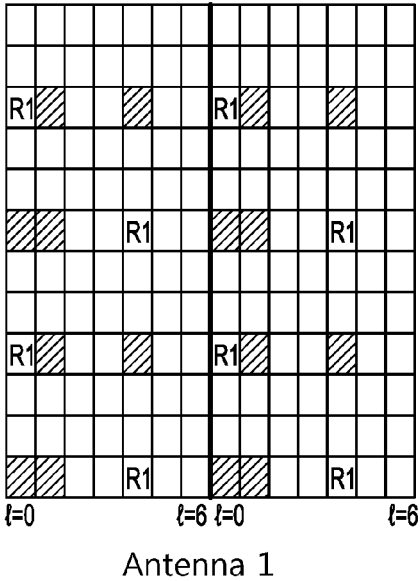
Figure 9:
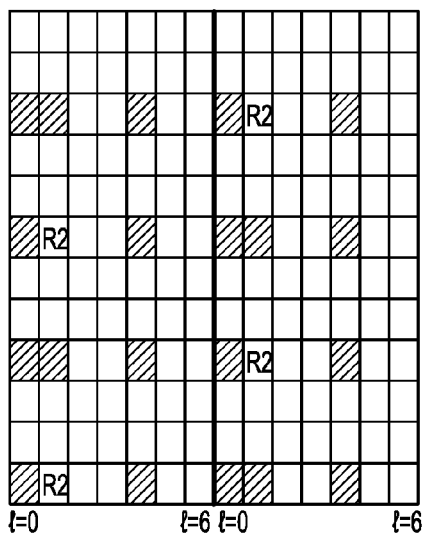
Figure 9:
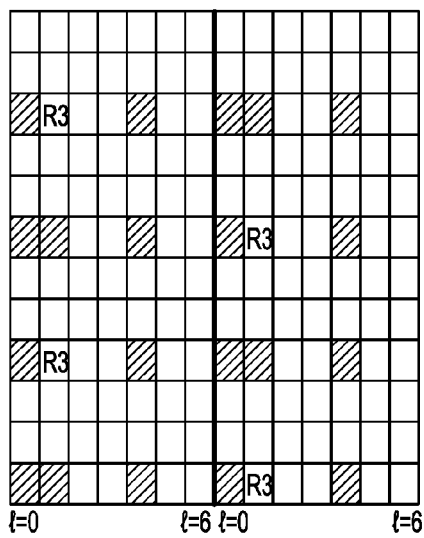

FIG. 7 to FIG. 9 show an example of a resource block (RB) to which a cell-specific reference signal (CRS) is mapped.

An example of a pattern in which the CRS is mapped to the RB is shown for a case where a BS uses one antenna port in FIG. 7, for a case where the BS uses two antenna ports in FIG. 8, and for a case where the BS uses 4 antenna ports in FIG. 9.

The CRS pattern may be used to support a characteristic of an LTE-A system. For example, a characteristic of a coordinated multi-point (CoMP) transmission and reception scheme, a spatial multiplexing scheme, etc., may be used In addition, the CRS may be used for channel quality measurement, CP detection, time/frequency synchronization, etc.

Referring to FIG. 7 to FIG. 9, in multi-antenna transmission, the BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted according to the number of antennas irrespective of the number of streams, and has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2 \times N_{RB}$. Therefore, a length of the CRS sequence is $2 \times N_{RB}$.

An RS sequence $r_{l,ns}(m)$ for CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, m is 0, 1, . . . , $2N_{RB}^{max}-1$. $2N_{RB}^{max}$ denotes the number of resource blocks corresponding to a maximum bandwidth. For example, when using a 3GPP LTE system, $2N_{RB}^{max}$ is 110. c(i) denotes a PN sequence as a pseudo-random sequence, and can be defined by a gold sequence having a length of 31. Equation 4 shows an example of a gold sequence c(n\

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 4]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $2N_{RB}^{max}$, a certain part with a length of $2 \times N_{RB}$ can be selected from an RS sequence generated in a length of $2 \times 2 N_{RB}^{max}$.

Frequency hopping may be applied to a CRS. A frequency hopping pattern may have a period of one radio frame (10 ms). Each frequency hopping pattern corresponds to one cell identity (ID) group.

Meanwhile, a UE-specific reference signal (URS) may be transmitted. The URS may be called a dedicated reference signal (DRS) or a demodulation reference signal (DM-RS). The CRS is transmitted in the entire region of the subframe, whereas the URS is transmitted in a data region of the subframe and is used to demodulate a corresponding PDSCH. That is, the URS is used by only a UE which receives a corresponding PDSCH. An RS sequence $r_{ns}(m)$ for the UE is the same as shown in Equation 3. In this case, $m=0, 1, \ldots, 12N_{PDSCH,RB}-1$, where $N_{PDSCH,RB}$ is the number of RBs of corresponding PDSCH transmission. A pseudo-random sequence generator is initialized to $c_{init}=$ (floor(ns/2)+1)$(2N^{cell}_{ID}+1)2^{16}+n_{RNTI}$ at a start of each subframe. $n_{RNTI}$ is a UE identifier.

The URS may be transmitted through either a single antenna or multiple antennas.

As described above, when the URS is transmitted through the multiple antennas, the pseudo-random sequence generator is initialized to $c_{init}=$(floor(ns/2)+1)$(2N^{cell}_{ID}+1)2^{16}+n_{SCID}$ at a start of each subframe. $n_{SCID}$ is a parameter acquired from a downlink (DL) grant (e.g., a DCI format 2B or 2C) related to PDSCH transmission. Herein, instead of a physical cell ID, a virtual cell ID received from a higher layer may be used for a transmission mode 10 for CoMP.

According to an antenna port or a layer, an RS sequence for the URS may be spread as a spread sequence as follows.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

The URS, that is, the DM-RS, is transmitted on antenna ports p=5, p=7, 8 or p=7, 8, . . . , v+6. In this case, v denotes the number of layers used in PDSCH transmission. The DM-RS is transmitted to one UE on any one antenna port which exists in a set S. In this case, the set S is defined as S={7, 8, 11, 13} or S={9, 10, 12, 14}. The DM-RS exists for demodulation of a PDSCH only in a case where transmission of the PDSCH is associated with a corresponding antenna port, and is valid only in this case. The DM-RS is transmitted only in an RB to which a corresponding PDSCH is mapped. The DM-RS is not transmitted in an RE on which any one of a physical channel or a physical signal is transmitted irrespective of an antenna port. The DM-RS may be found in the section 6.10.3 of 3GPP TS 36.211 V10.4.0.

Figure 10:
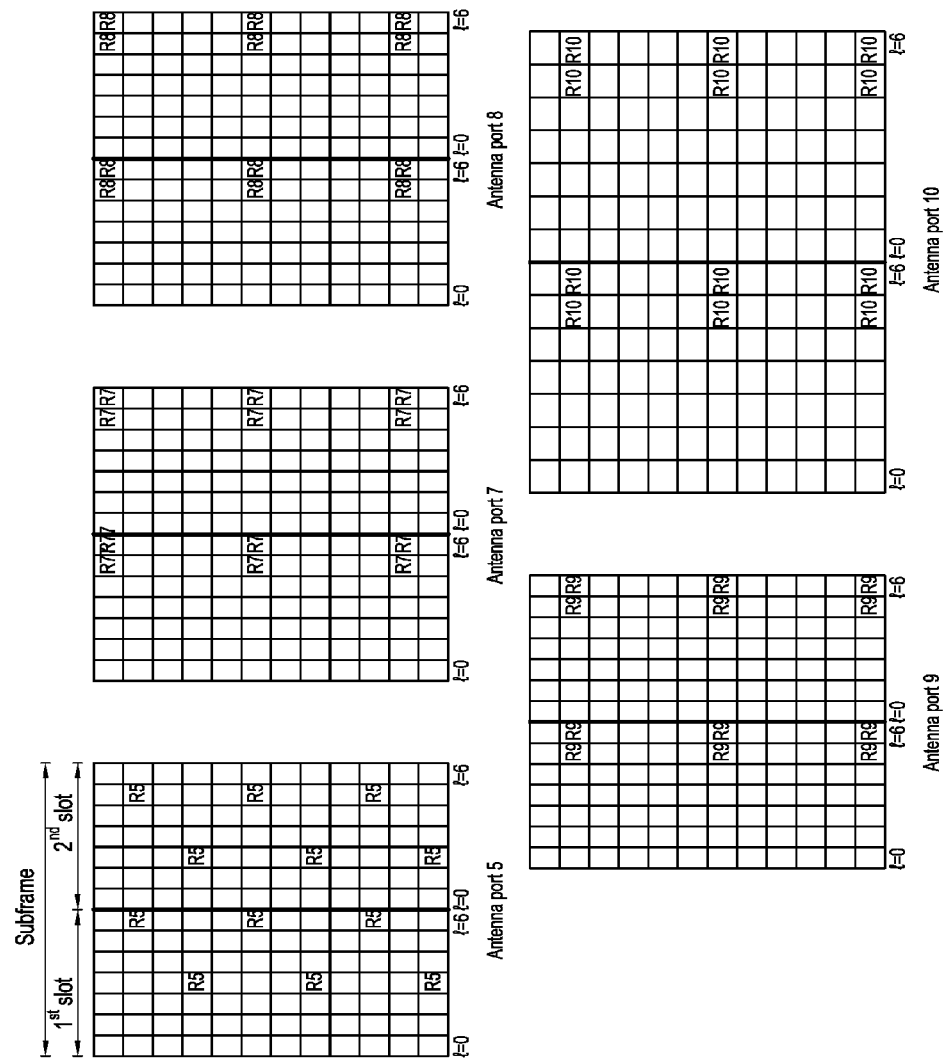
FIG. 10 shows an example of a resource block to which a demodulated reference signal (DM-RS) is mapped.

FIG. 10 shows an example of a resource block to which a DM-RS is mapped.

REs used for a DM-RS in a normal CP configuration are shown in FIG. 10. Rp denotes an RE used in DM-RS transmission on an antenna port p. For example, R5 indicates an RE on which a DM-RS for an antenna port 5 is transmitted. In addition, referring to FIG. 10, a DM-RS for antenna ports 7 and 8 is transmitted on an RE corresponding to $1^{st}$, $6^{th}$, and $11^{th}$ subcarriers (i.e., subcarrier indices 0, 5, and 10) of $6^{th}$ and $7^{th}$ OFDM symbols (i.e., OFDM symbol indices 5 and 6) of each slot. The DM-RS for the antenna ports 7 and 8 may be identified by a length-2 orthogonal sequence. A DM-RS for antenna ports 9 and 10 is transmitted on an RE corresponding to $2^{nd}$, $7^{th}$, and $12^{th}$ subcarriers (i.e., subcarrier indices 1, 6, and 11) of $6^{th}$ and $7^{th}$ OFDM symbols (i.e., OFDM symbol indices 5 and 6) of each slot. The DM-RS for the antenna ports 9 and 10 may be identified by the length-2 orthogonal sequence. In addition, since S={7, 8, 11, 13} or S={9, 10, 12, 14}, the DM-RS for the antenna ports 11 and 13 is mapped to an RE to which the DM-RS for the antenna ports 7 and 8 is mapped, and the DM-RS for the antenna ports 12 and 14 is mapped to an RE to which the DM-RS for the antenna ports 9 and 10 is mapped.

On the other hand, a CRS-RS is transmitted through 1, 2, 4, or 8 antenna ports. The antenna ports used in this case are respectively p=15, p=15, 16, p=15, . . . , 18, and p=15, . . . , 22. The CSI-RS may be defined only for Δf=15 kHz. The CSI-RS may be found in the section 6.10.3 of 3GPP TS 36.211 V10.4.0.

In CSI-RS transmission, up to 32 different configurations may be proposed to decrease an inter-cell interference (ICI) in a multi-cell environment including a heterogeneous network (HetNet) environment.

A CSI-RS configuration differs depending on a CP and the number of antenna ports in a cell, and neighboring cells may have different configurations to the maximum extent possible. In addition, according to a frame structure, the CSI-RS configuration may be divided into a case of applying to both a frequency division duplex (FDD) frame and a time division duplex (TDD) frame and a case of applying only to the TDD frame. A plurality of CSI-RS configurations may be used in one cell. Zero or one CSI configuration may be used for a UE which assumes non-zero transmit power, and zero or several CSI configurations may be used for a UE which assumes zero transmit power. The UE does not transmit the CSI-RS in a special subframe of the TDD frame, in a subframe in which CRI-RS transmission collides with a synchronization signal, a physical broadcast channel (PBCH), and a SystemInformationBlockType1, and in a subframe in which a paging message is transmitted. In addition, in a set S defined as S={15}, S={15, 16}, S={17, 18}, S={19, 20} or S={21, 22}, an RE on which a CSI-RS of one antenna port is transmitted is not used in transmission of a PDSCH or a CSI-RS of another antenna port.

Figure 11:
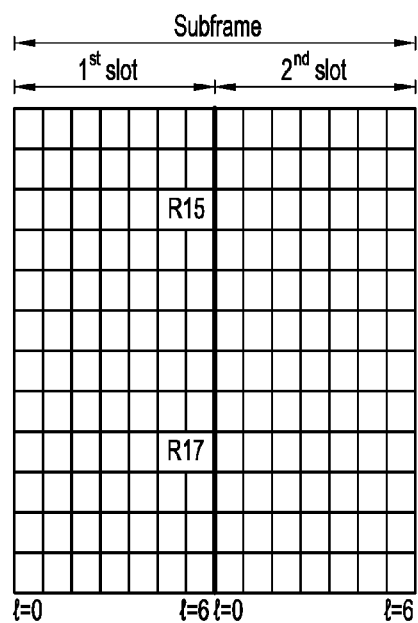
FIG. 11 shows an example of a resource block to which a channel state information (CSI) reference signal (RS) is mapped.
Figure 11:
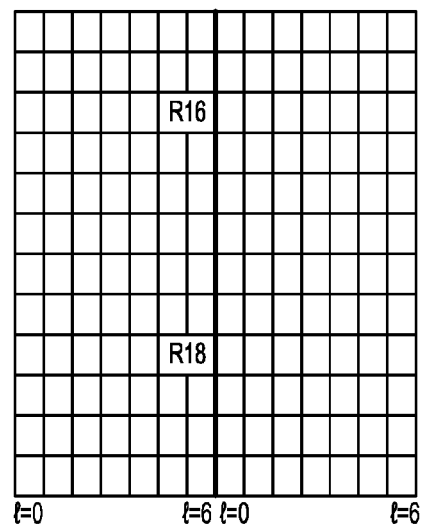
Figure 11:
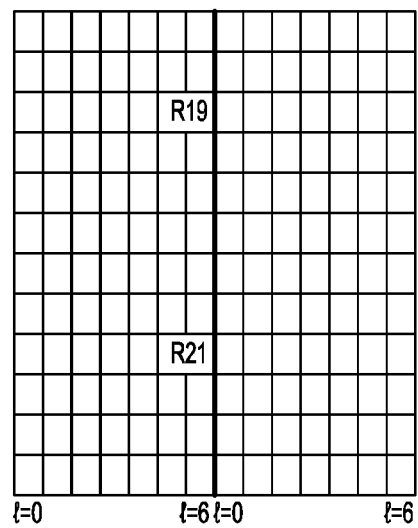
Figure 11:
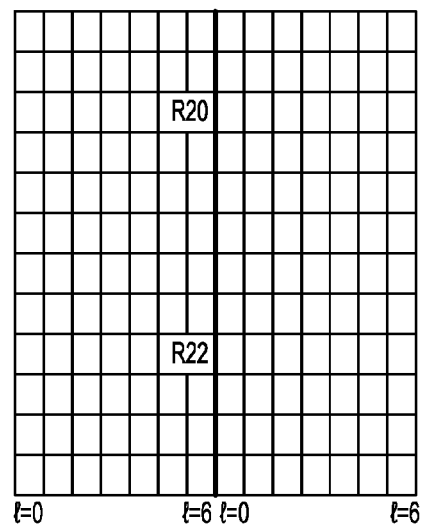

FIG. 11 shows an example of a resource block to which a CSI-RS is mapped.

REs used for a CSI-RS in a normal CP configuration is shown in FIG. 11. Rp denotes an RE used in CSI-RS transmission on an antenna port p. Referring to FIG. 11, a CSI-RS for antenna ports 15 and 16 is transmitted through an RE corresponding to a $3^{rd}$ subcarrier (i.e., a subcarrier index 2) of $6^{th}$ and $7^{th}$ OFDM symbols (i.e., OFDM symbol indices 5 and 6) of a $1^{st}$ slot. A CSI-RS for antenna ports 17 and 18 is transmitted through an RE corresponding to a $9^{th}$ subcarrier (i.e., a subcarrier index 8) of $6^{th}$ and $7^{th}$ OFDM symbols (i.e., OFDM symbol indices 5 and 6) of the $1^{st}$ slot. A CSI-RS for antenna ports 19 and 20 is transmitted through the same RE on which the CSI-RS for the antenna ports 15 and 16 is transmitted, and a CSI-RS for antenna ports 21 and 22 is transmitted through the same RE on which the CSI-RS for the antenna ports 17 and 18 is transmitted.

Meanwhile, a PDCCH is monitored in a limited area called a control region in a subframe. In addition, a CRS transmitted in a full band is used for demodulation of the PDCCH.

Hereinafter, the present invention is described.

<Introduction of New-Type Carrier>

Figure 12:
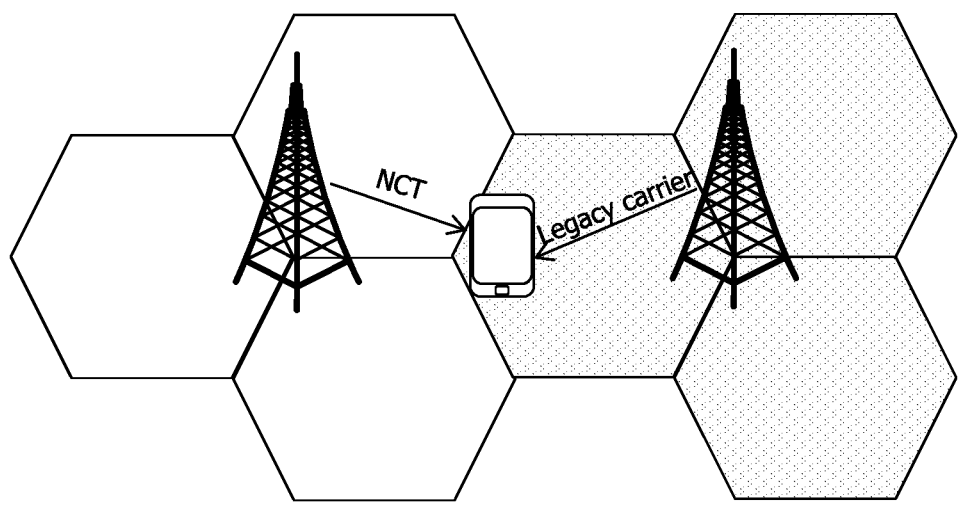
FIG. 12 shows an example of a new carrier for a next-generation wireless communication system.

FIG. 12 shows an example of a new carrier for a next-generation wireless communication system.

In the existing 3GPP LTE/LTE-A based wireless communication system, a reference signal, a synchronization signal, a control channel, etc., are transmitted through a downlink carrier. As such, the downlink carrier based on 3GPP LTE/LTE-A is called a legacy carrier.

However, there is a need to introduce a new carrier to mitigate an interference among multiple serving cells and to improve a carrier extensibility in the next-generation wireless communication system. This is called an extension carrier or new carrier type (NCT). A cell based on the extension carrier is called an extension cell.

If a subframe of an old type is used in a primary cell (i.e., PCell) and an NCT subframe is used in a secondary cell (i.e., SCell), a configuration for a subframe may be signaled through the primary cell (i.e., PCell). The secondary cell (i.e., SCell) used in the NCT subframe may be activated by the primary cell.

In the NCT, CRS transmission which is performed with a fixed high density is omitted or significantly reduced. In a legacy carrier, the CRS is transmitted in all downlink subframes across a full system band. On the contrary, in the NCT, the CRS may not be transmitted, or may be transmitted in a specific downlink subframe across a part of the system band. Accordingly, in the NCT, the CRS may be not used in demodulation but used only in synchronization tracking. In this sense, the CRS may also be called a tracking RS (TRS) or an enhanced synchronization signal (eSS) or a reduced CRS (RCRS).

The PDCCH is demodulated on the basis of the CRS in case of the legacy carrier, whereas the PDCCH may not be transmitted in case of the NCT. The CRS is used in data demodulation in case of the legacy carrier, whereas only a URS is used in data demodulation in case of the NCT.

Accordingly, the UE receives downlink data on the basis of the URS or a DM-RS, and measures a channel state on the basis of a CSI-RS which is transmitted less frequently.

As described above, since an overhead caused by an RS is minimized, a reception performance is improved, and a radio resource can be effectively used.

Meanwhile, an example of applying a transmit diversity in a new-type carrier will be described hereinafter.

<Method of Applying Transmit Diversity for New-Type Carrier>

Figure 13:
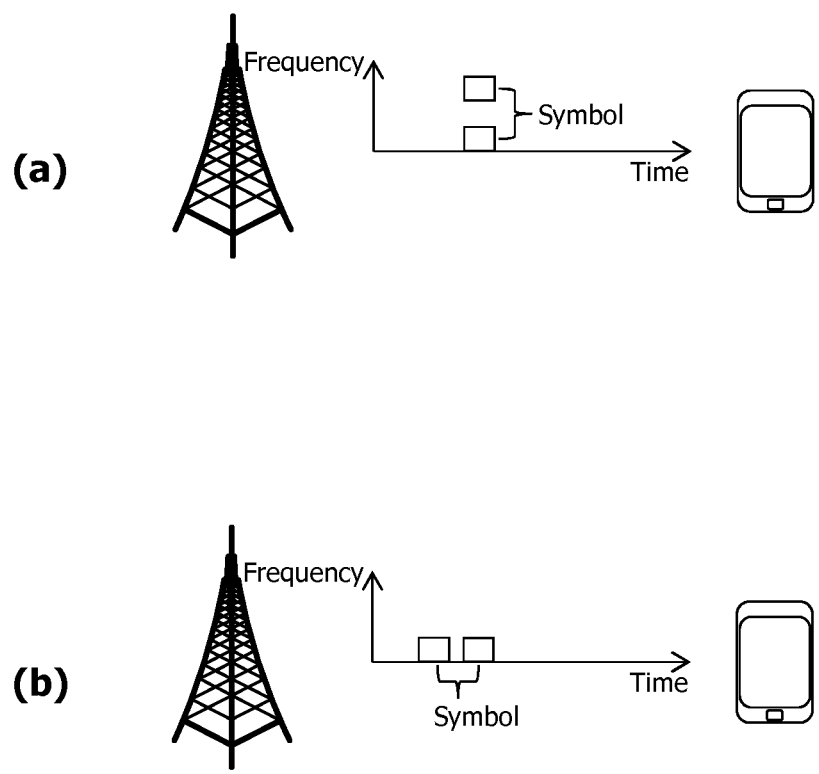
FIGS. 13a and b show examples of a transmit diversity according to the present invention.

FIG. 13 shows an example of a transmit diversity according to the present invention.

A wireless channel experiences several problems such as a path loss, shadowing, fading, and a noise. When a transport channel experiences deep fading, if a different version or replica of a signal to be transmitted is not additionally transmitted, it is difficult for a receiver to determine the signal to be transmitted.

A resource corresponding to such a separate different version or replica is called a diversity, and is one of most important elements contributing to reliable transmission through the wireless channel.

As shown in FIG. 13(a), a space frequency block code (SFBC) may be used as a diversity scheme. According to the SFBC, the same OFDM symbol may be transmitted through several subcarriers.

In addition, as shown in FIG. 13(b), a space time block code (STBC) may be used as another diversity scheme. According to the STBC, the same symbol may be transmitted several times on a time axis.

Information regarding multiple antennas used in the aforementioned transmit diversity may be transmitted to a UE.

<Method of Using URS to Demodulate PDSCH when Transmit Diversity is Applied to New-Type Carrier>

When a PDSCH is transmitted using a transmit diversity in the legacy LTE/LTE-A system, a UE demodulates the PDSCH by using a CRS.

However, the CRS may not be transmitted in case of an NCT, and thus a URS or a DM-RS must be used to demodulate the PDSCH. In this case, conventionally, the URS is transmitted according to the number of layers of the PDSCH under the assumption that the same precoding as the PDSCH is applied. However, in order to demodulate the PDSCH to which the transmit diversity is applied, demodulation must be performed by using the URS transmitted according to the number of URS antenna ports corresponding to the number of transmit antennas. That is, to demodulate the PDSCH transmitted by applying the transmit diversity using two transmit antennas, the URS transmitted through two antenna ports must be used, which is the same as the number of antenna ports used for PDSCH transmission.

Accordingly, to demodulate the PDSCH transmitted by applying the transmit diversity, the UE must be informed of the information regarding the number of antenna ports of the URS.

Hereinafter, a method of reporting information regarding the number of antenna ports of a URS to a UE is described with reference of FIG. 14.

Figure 14:
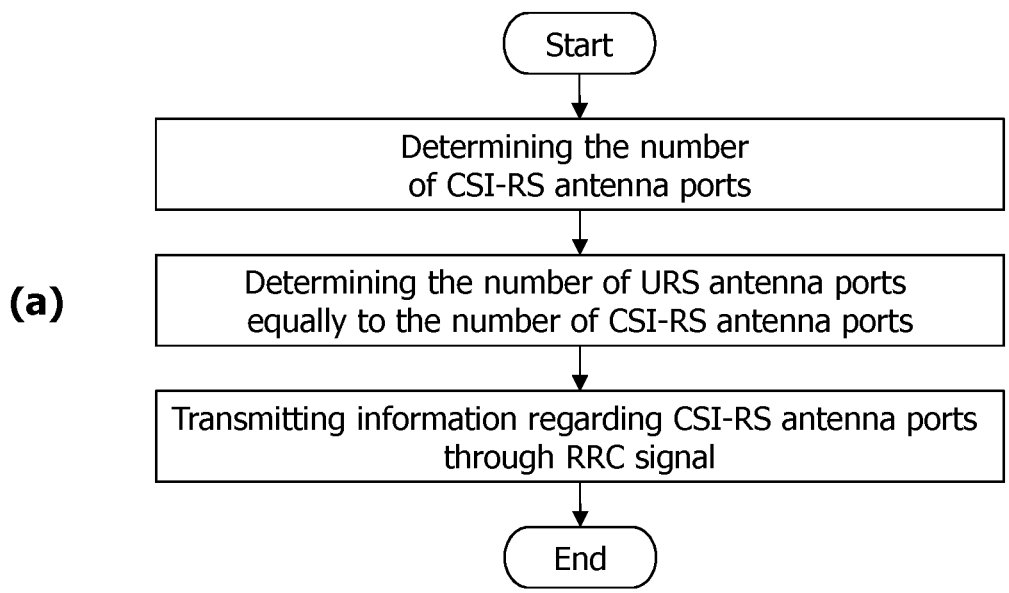
FIGS. 14a and b show methods of reporting information regarding the number of antenna ports of a user equipment specific reference signal (URS) to a user equipment according to an embodiment of the present invention.
Figure 14:
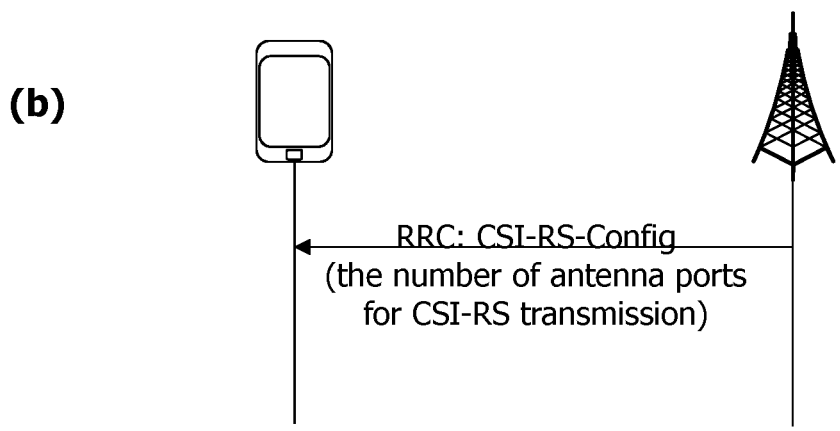

FIG. 14 shows a method of reporting information regarding the number of antenna ports of a URS to a UE according to an embodiment of the present invention.

Referring to FIG. 14(a), a BS first configures the number of antenna ports for transmitting a CSI-RS. Subsequently, the BS determines the number of URS antenna ports so that the number is equal to the number of CSI-RS antenna ports. Subsequently, information regarding the number of CSI-RS antenna ports is transmitted to the UE through a radio resource control (RRC) signal.

Referring to FIG. 14(b), the RRC signal may be a CSI-RS-Config information element (IE).

Table 5 below simply shows the CSI-RS-Config IE for convenience of explanation.

TABLE 5

```
CSI-RS-Config IE
{
    csi-RS // (OPTIONAL)
    {
        Antenna port:             Select one of 1, 2, 4, 8,
        resource configuration:   Select one of integers 0 to 31,
        subframe configuration:   Select one of integers 0 to 154,
        Power control:            Select one of integers −8 to 15
    }
    zeroTxPowerCSI-RS //(OPTIONAL)
    {
        zeroTxPowerResourceConfigList:   16-bit bitmap,
        zeroTxPowerSubframeConfig:       Select one of
                                         integers 0 to 154
    }
}
```

Referring to Table 5, the 'antennaPortsCount' field indicates the number of antenna ports used for CSI-RS transmission. The 'resourceConfig' field indicates a CSI-RS configuration. The 'SubframeConfig' field and the 'zeroTxPowerSubframeConfig' field indicate a subframe configuration for transmitting the CRS-RS.

The 'zeroTxPowerResourceConfigList' field indicates a configuration of a zero-power CSI-RS. A CSI-RS configuration corresponding to a bit which is set to 1 in the 16-bit bitmap constituting the 'zeroTxPowerResourceConfigList' field may be configured as a zero-power CSI-RS.

A sequence $r_{l,ns}(m)$ for the CSI-RS may be generated by Equation 5 below.

$$r_{l,ns}(m) = \frac{1}{\sqrt{2}}(1 - 2 \cdot c(2m)) + j\frac{1}{\sqrt{2}}(1 - 2 \cdot c(2m+1)),$$

$$m = 0, \ldots, N_{RB}^{max,DL} - 1$$

[Equation 5]

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 5 above, $n_s$ denotes the number of slots in a radio frame, and l denotes the number of OFDM symbols in a slot. c(i) denotes a pseudo random sequence, and starts with $c_{init}$ indicated in Equation 1 in each OFDM symbol. $N_{ID}^{cell}$ denotes a physical cell ID.

In subframes configured to transmit the CSI-RS, the RS sequence $r_{l,ns}(m)$ is mapped to a complex-valued modulation symbol $a_{k,l}^{(p)}$ used as a reference symbol for an antenna port p.

$r_{l,ns}(m)$ and $a_{k,l}^{(p)}$ are related by Equation 6 below.

$$a_{k,l}^{(p)} = w_{l''} \cdot r(m)$$

[Equation 6]

where, $$k = k' + 12m +$$

$$\begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0.1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 6 above, (k', l') and $n_s$ are given in Tables described below. The CSI-RS can be transmitted in a DL slot satisfying the conditions of Table 6 and Table 7 below (herein, 'mod' denotes a modular operation, that is, (ns mod 2) denotes a remainder obtained by dividing $n_s$ by 2).

Table 6 shows a configuration of a CSI-RS in a normal CP case, and Table 7 shows a configuration of a CSI-RS in an extended CP case.

TABLE 6

| | CSI-RS configuration index | Number of CSI-RSs configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |

TABLE 6-continued

| CSI-RS configuration index | Number of CSI-RSs configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 7

| | CSI-RS configuration index | Number of CSI-RSs configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Table 8 shows an example of a subframe configuration for CSI-RS transmission.

TABLE 8

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 8, a periodicity $T_{CSI-RS}$ and offset $\Delta_{CSI-RS}$ of a subframe in which a CSI-RS is transmitted may be determined according to a CSI-RS subframe configuration $I_{CSI-RS}$. The CSI-RS subframe configuration of Table 8 may be any one of the 'SubframeConfig' field and the 'ZeroTxPowerSubframeConfig' field of the CSI-RS-Config IE of Table 5. The CSI-RS subframe configuration may be separately configured as to a non-zero power CSI-RS and a zero power CSI-RS.

Figure 15:
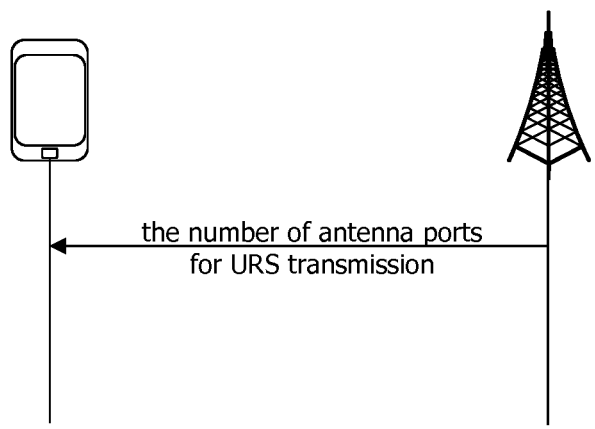
FIG. 15 shows a method of reporting information regarding the number of antenna ports of a URS to a user equipment according to another embodiment of the present invention.

FIG. 15 shows a method of reporting information regarding the number of antenna ports of a URS to a UE according to another embodiment of the present invention.

Referring to FIG. 15, information regarding the number of antenna ports of a URS used to demodulate a PDSCH transmitted by applying a transmit diversity may be directly transmitted by a BS to the UE. The information regarding the number of antenna ports of the URS may be transmitted through an RRC signal or a PDCCH.

<Available Precoding when Applying Transmit Diversity to New-Type Carrier>

When a transmit diversity is applied to a new-type carrier, available precoding may be as follows.

First, the following equation may be defined when two antenna ports P∈{7, 8} are used for a URS and an output is expressed by a matrix $y(i)=[y^{(7)}(i) y^{(8)}(i)]$, where i=0, 1, 2, ..., $M^{ap}_{symb}-1$.

$$\begin{bmatrix} y^{(7)}(2i) \\ y^{(8)}(2i) \\ y^{(7)}(2i+1) \\ y^{(8)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(7)}(i)) \\ \text{Re}(x^{(8)}(i)) \\ \text{Im}(x^{(7)}(i)) \\ \text{Im}(x^{(8)}(i)) \end{bmatrix} \quad \text{[Equation 7]}$$

Meanwhile, Equation 7 can be equally applied to P∈{7, 9}.

The following equation may be defined when four antenna P∈{7, 8, 9, 10} are used for a URS and an output is expressed by a matrix $y(i) = [y^{(7)}(i) y^{(8)}(i) y^{(9)}(i) y^{(10)}(i)]$, where $i=0, 1, 2, \ldots, M^{ap}_{symb}-1$.

$$\begin{bmatrix} y^{(7)}(4i) \\ y^{(8)}(4i) \\ y^{(9)}(4i) \\ y^{(10)}(4i) \\ y^{(7)}(4i+1) \\ y^{(8)}(4i+1) \\ y^{(9)}(4i+1) \\ y^{(10)}(4i+1) \\ y^{(7)}(4i+2) \\ y^{(8)}(4i+2) \\ y^{(9)}(4i+2) \\ y^{(10)}(4i+2) \\ y^{(7)}(4i+3) \\ y^{(8)}(4i+3) \\ y^{(9)}(4i+3) \\ y^{(10)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \text{Re}(x^{(7)}(i)) \\ \text{Re}(x^{(8)}(i)) \\ \text{Re}(x^{(9)}(i)) \\ \text{Re}(x^{(10)}(i)) \\ \text{Im}(x^{(7)}(i)) \\ \text{Im}(x^{(8)}(i)) \\ \text{Im}(x^{(9)}(i)) \\ \text{Im}(x^{(10)}(i)) \end{bmatrix}$$

<Improvement on PRB Bundling for URS-Based Demodulation>

As described above, conventionally, the same precoding used in data transmitted on a PDSCH is applied in a URS. In addition, conventionally, the same precoding is forced to be applied to a plurality of physical resource blocks (PRBs) allocated to a UE for a PDSCH, and this is called PRB bundling. In addition, a duration in which the PRB bundling is applied is called a PRB bundling window. As such, since the same precoding is applied to all PRBs in the PRB bundling window, the UE can more simply perform channel estimation.

However, according to the present invention, the same precoding may not be applied to a URS and PDSCH data to which a transmit diversity is applied, or precoding may not be applied to the URS at all. Therefore, according to the present invention, a restriction for PRB bundling may be unnecessary.

That is, when data on the PDSCH transmitted by applying the transmit diversity is demodulated by using the URS, the PRB bundling may not be applied. In this case, the UE may perform an operation of channel estimation or the like by using all URSs on the allocated PRB.

<Method for Enabling URS-Based Demodulation when DVRB is Applied>

In case of the conventional DVRB resource allocation, one PRB pair may be located in different frequency domains with respect to a slot of a subframe.

Accordingly, in order to demodulate a PDSCH scheduled with a DVRB resource by using a URS, precoding to be applied to the URS on the basis of a slot may be applied differently according to a first method of the present invention.

For example, in a system having two antennas, PDSCH data and URS of a first slot of a certain subframe may be transmitted using precoding of $$\begin{vmatrix} a1 \\ a2 \end{vmatrix},$$

and PDSCH data and URS of a second slot may be transmitted using precoding of $$\begin{vmatrix} b1 \\ b2 \end{vmatrix}.$$

Herein, $$\begin{vmatrix} a1 \\ a2 \end{vmatrix} \neq \begin{vmatrix} b1 \\ b2 \end{vmatrix}.$$

In addition, it may be determined by a higher layer such that the DVRB is demodulated by using the URS.

Alternatively, in order to demodulate a PDSCH scheduled with a DVRB resource by using the URS, according to a second method of the present invention, a PRB pair located in different frequency domains with respect to a slot of a subframe may be located in the same frequency domain. Whether to perform a distributed allocation as such may be determined by the higher layer. In this case, a size of an RBG for performing PRB bundling may be preferably set to 1.

<Adding of New Transmission Mode when Transmit Diversity is Applied to New-Type Carrier>

As described above, the transmission modes 1 to 9 are present conventionally. However, for a transmit diversity, a new transmission mode may be defined according to the present invention.

1) First New Transmission Mode

A PDSCH is transmitted to up to 8 layers by using antenna ports 7 to 14, and control information is transmitted using a DCI format 2C.

If the number of URS antenna ports used to demodulate a PDSCH transmitted by applying a transmit diversity is 1, the PDSCH is transmitted through a single antenna port (i.e., a port 7) without the use of the transmit diversity, and control information is transmitted by using a DCI format 1A. If the number of URS antenna ports used to demodulate the PDSCH transmitted by applying the transmit diversity is greater than 1, the PDSCH is transmitted by applying the transmit diversity (in case of two URS antenna ports, ports 7 and 8 are used; in case of four URS antenna ports, ports 7, 8, 9, and 10 are used), and the control information is transmitted by using the DCI format 1A.

2) Second New Transmission Mode

A PDSCH is transmitted to up to 2 layers by using antenna ports 7 and 8, and control information is transmitted using a DCI format 2B.

If the number of URS antenna ports used to demodulate a PDSCH transmitted by applying a transmit diversity is 1, the PDSCH is transmitted through a single antenna port (i.e., a port 7) without the use of the transmit diversity, and control information is transmitted by using a DCI format 1A. If the number of URS antenna ports used to demodulate the PDSCH transmitted by applying the transmit diversity is greater than 1, the PDSCH is transmitted by applying the transmit diversity (in case of two URS antenna ports, ports 7 and 8 are used; in case of four URS antenna ports, ports 7, 8, 9, and 10 are used), and the control information is transmitted by using the DCI format 1A.

3) Third New Transmission Mode

A PDSCH is transmitted using a transmit diversity, and control information is transmitted using a DCI format 1.

The PDSCH is transmitted through a single antenna port (i.e., a port 7) as to all subframe types, and the control information is transmitted by using the DCI format 1A.

<PDSCH Transmission Scheme>

As described above, in case of an NCT, a PDSCH may be demodulated by using a URS, and CQI estimation may be performed by using a CSI-RS. However, in case of TDD, since a downlink and an uplink use the same frequency, an amount of CSI feedback can be decreased by using channel reciprocity. As such, to support the CSI feedback which can use the channel reciprocity, whether to feed back PMI/RI can be determined by a higher layer.

In particular, in case of the aforementioned first and second new transmission modes, the CSI is reported by using a CSI-RS antenna port so that multi-layer transmission is possible. For the multi-layer transmission, a CSI report for a transmit diversity is transmitted by being inserted in the middle of the CSI report. The CSI report for the multi-layer transmission may be RI/PMI transmission, whereas only a CQI may be reported in the CSI report for the transmit diversity.

In addition, in case of the aforementioned third new transmission mode, the CSI report for the single antenna port may be inserted in the middle of the CSI report for the transmit diversity. The CSI report for the transmit diversity may report only the CQI, whereas a PMI may be transmitted in the CSI report for the single antenna port.

The CSI report for the transmit diversity is performed by using the CSI RS. Herein, in a 2-antenna transmit diversity case, two antenna ports (i.e., ports 15 and 16) for the CSI RS may be used, and in a 4-antenna transmit diversity case, four CSI-RS ports (i.e., CSI-RS ports 15, 16, 17, and 18) may be used.

The aforementioned embodiments and modifications can be implemented through various means. For example, the embodiments of the present invention can be implemented in hardware, firmware, software, combination of them, etc.

Details thereof will be described with reference to FIG. 16.

Figure 16:
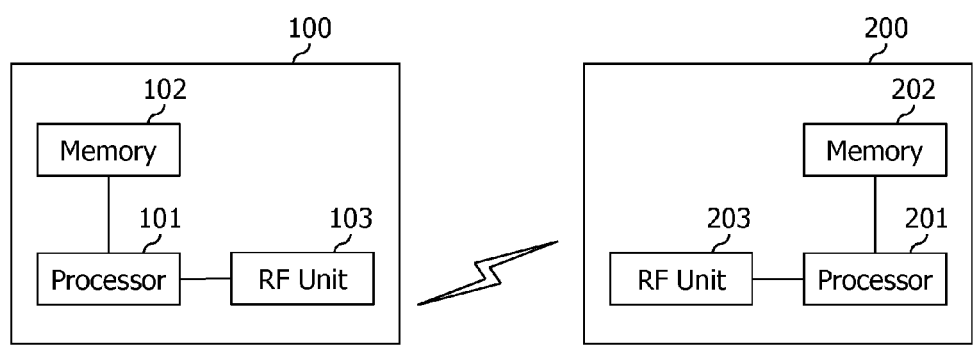
FIG. 16 is a block diagram showing a wireless communication system according to an embodiment of the present invention.

FIG. 16 is a block diagram showing a wireless communication system according to an embodiment of the present invention.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

A wireless device 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A data demodulation method comprising:
setting a terminal to a transmission mode of a physical downlink shared channel (PDSCH) to which a transmit diversity is applied;
receiving resource allocation information of the PDSCH by the terminal;
receiving downlink (DL) data on the PDSCH to which the transmit diversity is applied according to the resource allocation information;

receiving information regarding the number of antenna ports used for reception of a reference signal used for demodulation of the DL data;

receiving the reference signal; and demodulating the DL data using the reference signal, wherein the reference signal is generated based on an identifier of the terminal, and wherein the number of antenna ports used for reception of the reference signal is equal to the number of antenna ports used for reception of the PDSCH, wherein a sequence of the reference signal is generated by $$r_{n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 12N_{RB}^{PDSCH} - 1,$$

where $N_{RB}^{PDSCH}$ denotes a number of resource blocks of a corresponding PDSCH transmission, and C( ) denotes a pseudo random sequence.

2. The data demodulation method of claim 1, wherein the PDSCH and the reference signal are received in a second serving cell activated by a first serving cell.

3. The data demodulation method of claim 1, wherein the reference signal is generated on the basis of the identifier of the terminal and an identifier of the second serving cell.

4. The data demodulation method of claim 1, wherein the number of antenna ports used in reception of the reference signal is equal to the number of antenna ports of a channel state information (CSI) reference signal (RS) used in measurement of CSI.

5. The data demodulation method of claim 4, wherein information regarding the number of antenna ports used in reception of the reference signal is information regarding the number of CSI RS antenna ports.

6. The data demodulation method of claim 1, wherein the transmit diversity is applied to the reference signal.

7. A data demodulation method comprising:

receiving, from a secondary cell operating with a second type of carrier and activated by a primary cell operating with a first type of carrier, information regarding multiple transmit antennas that are being used for transmit diversity wherein a cell-specific reference signal (CRS) is contained in the first type of carrier, and a user-specific reference signal (URS) is contained in the second type of carrier;

receiving a shared data channel on the second type of carrier, which is transmitted by applying the transmit diversity by the use of the multiple transmit antennas of the secondary cell; and demodulating data on the shared data channel by using the URS, wherein if a distributed virtual resource block (DVRB) is used in the second type of carrier of the secondary cell, precoding applied to the URS is changed in unit of a slot on a time axis.

8. The data demodulation method of claim 7, wherein on the second type of carrier, the CRS capable of demodulating the data on the shared data channel is not sufficient or is not transmitted.

9. The data demodulation method of claim 7, further comprising receiving information regarding a number of antenna ports on which the URS is transmitted.

10. The data demodulation method of claim 9, wherein the information regarding the number of antenna ports on which the URS is transmitted is acquired from information regarding the number of antenna ports on which a CSI-RS is transmitted.

11. The data demodulation method of claim 9, wherein the information regarding the number of antenna ports on which the URS is transmitted is received through a radio resource control (RRC) message or a physical downlink control channel (PDCCH).

12. The data demodulation method of claim 7, wherein different precoding is applied to the URS and the data.

* * * * *